United States Patent
Hayashi (10) Patent No.: US 11,334,049 B2
(45) Date of Patent: May 17, 2022

(54) MACHINE CONTROL DEVICE

(71) Applicant: FANUC CORPORATION, Yamanashi (JP)

(72) Inventor: Yasushi Hayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 103 days.

(21) Appl. No.: 16/742,301

(22) Filed: Jan. 14, 2020

(65) Prior Publication Data

US 2020/0249653 A1 Aug. 6, 2020

(30) Foreign Application Priority Data

Jan. 31, 2019 (JP) .............................. JP2019-015203

(51) Int. Cl.
G05B 19/4063 (2006.01)

(52) U.S. Cl.
CPC ................... *G05B 19/4063* (2013.01); *G05B 2219/32356* (2013.01)

(58) Field of Classification Search
None
See application file for complete search history.

(56) References Cited

U.S. PATENT DOCUMENTS

| | | | | |
|---|---|---|---|---|
| 6,061,507 A * | 5/2000 | Fitzgerald | ........ | G01R 31/31908 716/136 |
| 2012/0297366 A1* | 11/2012 | Andrews | ............. | G06F 11/3688 717/124 |
| 2014/0261309 A1* | 9/2014 | Chen | ................... | F02D 41/0082 123/320 |
| 2018/0074927 A1* | 3/2018 | Mori | ....................... | G06F 11/27 |

FOREIGN PATENT DOCUMENTS

| | | |
|---|---|---|
| JP | 62-219105 | 9/1987 |
| JP | 5681224 | 3/2015 |

* cited by examiner

*Primary Examiner* — Carlos R Ortiz Rodriguez
(74) *Attorney, Agent, or Firm* — Wenderoth, Lind & Ponack, L.L.P.

(57) ABSTRACT

A machine control device includes: a diagnostic test time calculation unit that calculates a scheduled execution time of a diagnostic test; a program execution time prediction unit that predicts a predicted ending time of a program before executing the program; a diagnostic test execution determination unit that determines whether to execute the diagnostic test at a predetermined time, by determining whether the predicted ending time of the program exceeds the scheduled execution time of the diagnostic test, and a diagnostic test execution unit that executes the diagnostic test, in which, in a case in which the predicted ending time of the program exceeds the scheduled execution time of the diagnostic test, the diagnostic test execution determination unit instructs the diagnostic test execution unit to execute the diagnostic test prior to the scheduled execution time of the diagnostic test before executing the program.

6 Claims, 7 Drawing Sheets

1) T3 < T2 : EXECUTE TEST BEFORE THE START OF PROGRAM

T1: SCHEDULED EXECUTION TIME OF DIAGNOSTIC TEST
T2: PREDICTED ENDING TIME OF PROGRAM
T3: SCHEDULED COMPENSATION EXECUTION TIME OF
    DIAGNOSTIC TEST
T4: ACTUAL ENDING TIME OF PROGRAM
t1: PREDICTED EXECUTION TIME OF PROGRAM
t3: COMPENSATION TIME
△: START TIME OF PROGRAM
▽: SCHEDULED ENDING TIME OF PROGRAM
▼: ACTUAL ENDING TIME OF PROGRAM
□: SCHEDULED COMPENSATION EXECUTION TIME OF
    DIAGNOSTIC TEST
○: SCHEDULED EXECUTION TIME OF DIAGNOSTIC TEST
●: EXECUTION TIME OF DIAGNOSTIC TEST

FIG. 3

2) T3 > T2 && T4 < T3 : DIAGNOSTIC TEST IS TO BE EXECUTED AS SCHEDULED

T1 : SCHEDULED EXECUTION TIME OF DIAGNOSTIC TEST
T2 : PREDICTED ENDING TIME OF PROGRAM
T3 : SCHEDULED COMPENSATION EXECUTION TIME OF DIAGNOSTIC TEST
T4 : ACTUAL ENDING TIME OF PROGRAM
t1 : PREDICTED EXECUTION TIME OF PROGRAM
t3 : COMPENSATION TIME
△ : START TIME OF PROGRAM
▽ : SCHEDULED ENDING TIME OF PROGRAM
▼ : ACTUAL ENDING TIME OF PROGRAM
□ : SCHEDULED COMPENSATION EXECUTION TIME OF DIAGNOSTIC TEST
○ : SCHEDULED EXECUTION TIME OF DIAGNOSTIC TEST
● : EXECUTION TIME OF DIAGNOSTIC TEST

FIG. 4

3) T3 > T2 && T4 > T3 : EXECUTING TEST IN SEGMENT OF t3

T1 : SCHEDULED EXECUTION TIME OF DIAGNOSTIC TEST
T2 : PREDICTED ENDING TIME OF PROGRAM
T3 : SCHEDULED COMPENSATION EXECUTION TIME OF DIAGNOSTIC TEST
T4 : ACTUAL ENDING TIME OF PROGRAM
t1 : PREDICTED EXECUTION TIME OF PROGRAM
t3 : COMPENSATION TIME
△ : START TIME OF PROGRAM
▽ : SCHEDULED ENDING TIME OF PROGRAM
▼ : ACTUAL ENDING TIME OF PROGRAM
□ : SCHEDULED COMPENSATION EXECUTION TIME OF DIAGNOSTIC TEST
○ : SCHEDULED EXECUTION TIME OF DIAGNOSTIC TEST
● : EXECUTION TIME OF DIAGNOSTIC TEST

MACHINE CONTROL DEVICE

This application is based on and claims the benefit of priority from Japanese Patent Application No. 2019-015203, filed on 31 Jan. 2019, the content of which is incorporated herein by reference.

BACKGROUND OF THE INVENTION

Field of the Invention

The present invention relates to a control device that controls a machine tool or a machine such as an industrial robot.

Related Art

In a machine tool or a machine such as an industrial robot, it has been known that, for example, diagnostic tests are executed at regular intervals in order to avoid impairment of safety functions due to failure or the like of mechanical components (for example, refer to Japanese Patent No. 5,681,224 and Japanese Unexamined Patent Application, Publication No. S62-219105).

An example of such a diagnostic test is a diagnostic test of a power cutoff circuit for emergency stopping of axis movement when an abnormality of a machine is detected (MCC cutoff test). In this diagnostic test, power cutoff is actually performed, and an abnormality of the cutoff circuit is detected by checking a contact state of the power cutoff circuit at that time. Since power cutoff is required, it is not possible to execute this diagnostic test during automatic operation of the machine. Therefore, it is necessary for a machine operator to check the timing at which the automatic operation of the machine is not performed and to execute the diagnostic test.

For example, a numerical control device that controls a machine tool or a machine such as an industrial robot notifies the machine operator (or a PLC device) that the set time of the diagnostic test has elapsed, and the machine operator (or the PLC device) determines the timing of executing the diagnostic test on the basis of the state of the machine, and thereafter, executes the diagnostic test.

Patent Document 1: Japanese Patent No. 5681224
Patent Document 2: Japanese Unexamined Patent Application, Publication No. S62-219105

SUMMARY OF THE INVENTION (1) In a case in which the time of the diagnostic test comes during the automatic operation of the machine, if the automatic operation of the machine is prioritized, it is not possible to execute the diagnostic test within a predetermined cycle. In such a case, there is an increased risk of the safety function malfunctioning due to the failure of mechanical components and the like.

(2) In a case of becoming time of the diagnostic test during the automatic operation of the machine, if the diagnostic test is prioritized, machining is interrupted at an unintended timing. In this case, machining defects may occur.

(3) In order to reliably execute the diagnostic tests within a predetermined period, it is necessary for the machine operator to check the elapsed time between the diagnostic tests and the time of the automatic operation of the machine. This work has been a burden on the machine operator.

Therefore, in the machine control device, it is desirable to execute diagnostic tests, (1) within a predetermined period, (2) while avoiding occurrence of machining defects, (3) automatically.

A machine control device according to the present disclosure is a machine control device that controls operation of a machine on a basis of a program and executes a diagnostic test of a safety function of the machine at a predetermined time, includes: a diagnostic test time calculation unit that calculates a scheduled execution time $T1$ of the diagnostic test; a program execution time prediction unit that predicts a predicted ending time $T2$ of the program before executing the program; a diagnostic test execution determination unit that determines whether to execute the diagnostic test at the predetermined time, by determining whether the predicted ending time $T2$ of the program exceeds the scheduled execution time $T1$ of the diagnostic test, and a diagnostic test execution unit that executes the diagnostic test, in which, in a case in which the predicted ending time $T2$ of the program exceeds the scheduled execution time $T1$ of the diagnostic test, the diagnostic test execution determination unit instructs the diagnostic test execution unit to execute the diagnostic test prior to the scheduled execution time $T1$ of the diagnostic test before executing the program.

According to an aspect of the present invention, it is possible to execute diagnostic tests, (1) within a predetermined period, (2) while avoiding occurrence of machining defects, (3) automatically.

DETAILED DESCRIPTION OF THE INVENTION

In the following, an example of an embodiment of the present invention will be described with reference to the attached drawings. It should be noted that the same reference symbols will be attached to identical or corresponding portions in the respective drawings.

Figure 1:
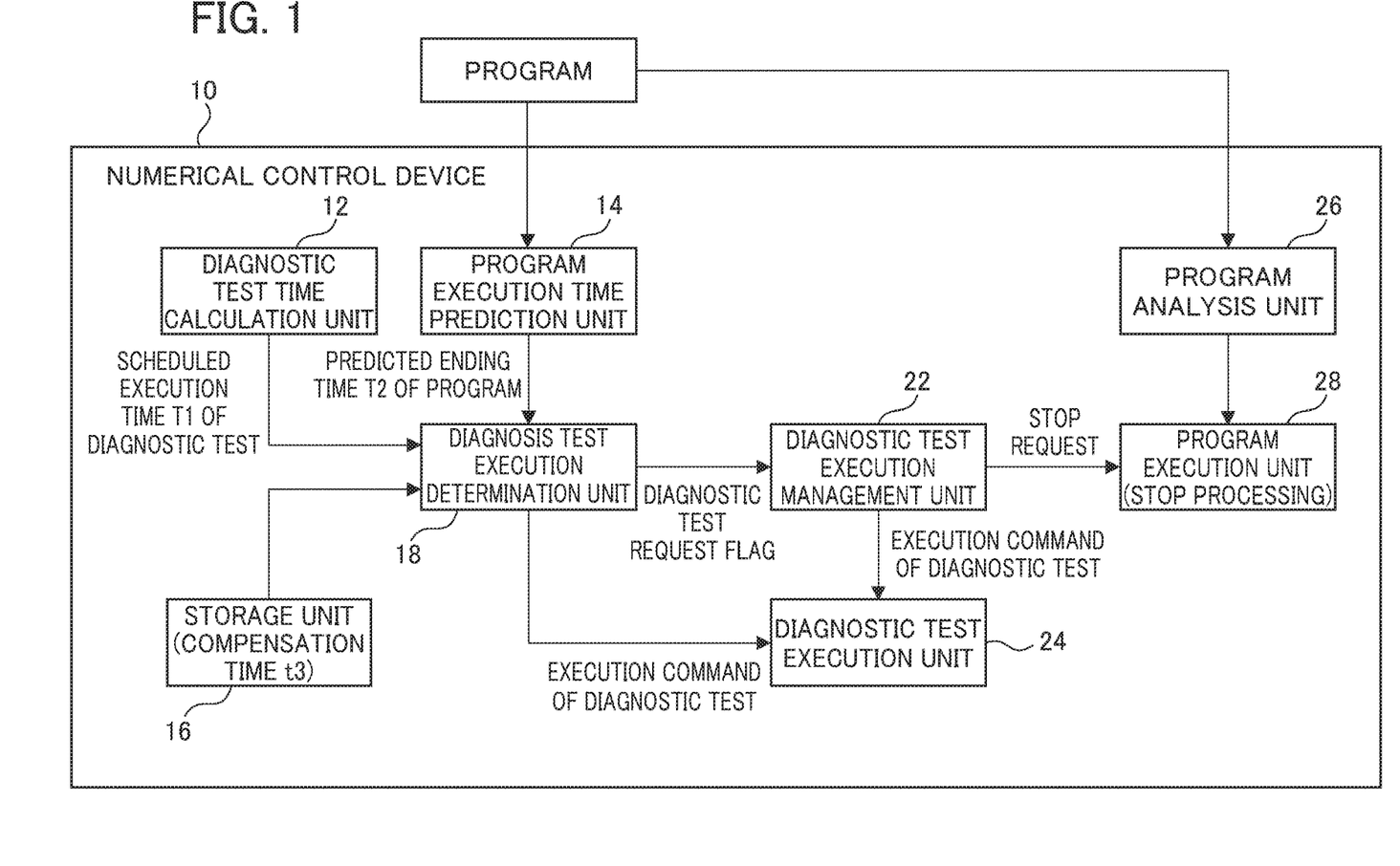
FIG. 1 is a diagram illustrating the configuration of a machine control device according to an embodiment of the present invention.

FIG. 1 is a diagram illustrating the configuration of a machine control device according to an embodiment of the present invention. A machine control device 10 illustrated in FIG. 1 is, for example, a numerical control device that controls the operation of a machine tool and a machine such as an industrial robot on the basis of program. The machine control device 10 has a function of executing diagnostic tests of safety functions of the machine at regular cycles (intervals).

Such diagnostic tests include diagnostic tests that cannot be executed during the execution of program, as described below.

(1) Power Cutoff Circuit Test

A diagnostic test for checking the normal state of the power cutoff circuit by actually performing power cutoff and checking the contact state of the power cutoff circuit at that time.

(2) Braking Test

A diagnostic test for checking the normal state of the brake. Like a gravity axis, the braking test is performed for an axis for which there is a risk of the axis falling if power is lost. The normal state of the brake is checked by applying torque to the motor with the brake applied and checking that the motor does not move.

(3) CPU Self-Diagnostic Test/RAM Test

A diagnostic test to check that the CPU and RAM of a control device operates normally. In the CPU self-diagnostic test, execution results of various commands are checked, or the read/write operation to the register is checked. The RAM test checks that the RAM read/write operation is performed correctly. Both of the diagnostic tests need to be executed in a safe state in which the shaft does not move while the power is cut off in order to execute the diagnostic test on the CPU and the RAM area used during the program execution.

The machine control device 10 includes a diagnostic test time calculation unit 12, a program execution time prediction unit 14, a storage unit 16, a diagnostic test execution determination unit 18, a diagnostic test execution management unit 22, a diagnostic test execution unit 24, a program analysis unit 26, and a program execution unit (a program stop processing unit) 28.

The control device 10 (excluding the storage unit 16) is configured by, for example, an arithmetic processor such as a DSP (Digital Signal Processor) or a FPGA (Field Programmable Gate Array). Various functions of the control device 10 are achieved by executing predetermined software (a program, an application) stored in the storage unit, for example. The various functions of the control device 10 may be achieved by the cooperation of hardware and software. The storage unit 16 is, for example, rewritable memory such as EEPROM or a rewritable disk such as an HDD (Hard Disk Drive) or an SSD (Solid State Drive).

It should be noted that the diagnostic test time calculation unit 12, the program execution time prediction unit 14, the storage unit 16, and the diagnostic test execution determination unit 18 may be provided in, for example, the machine control device, or may be provided in a server device connected to the machine control device via a network.

Figure 2:
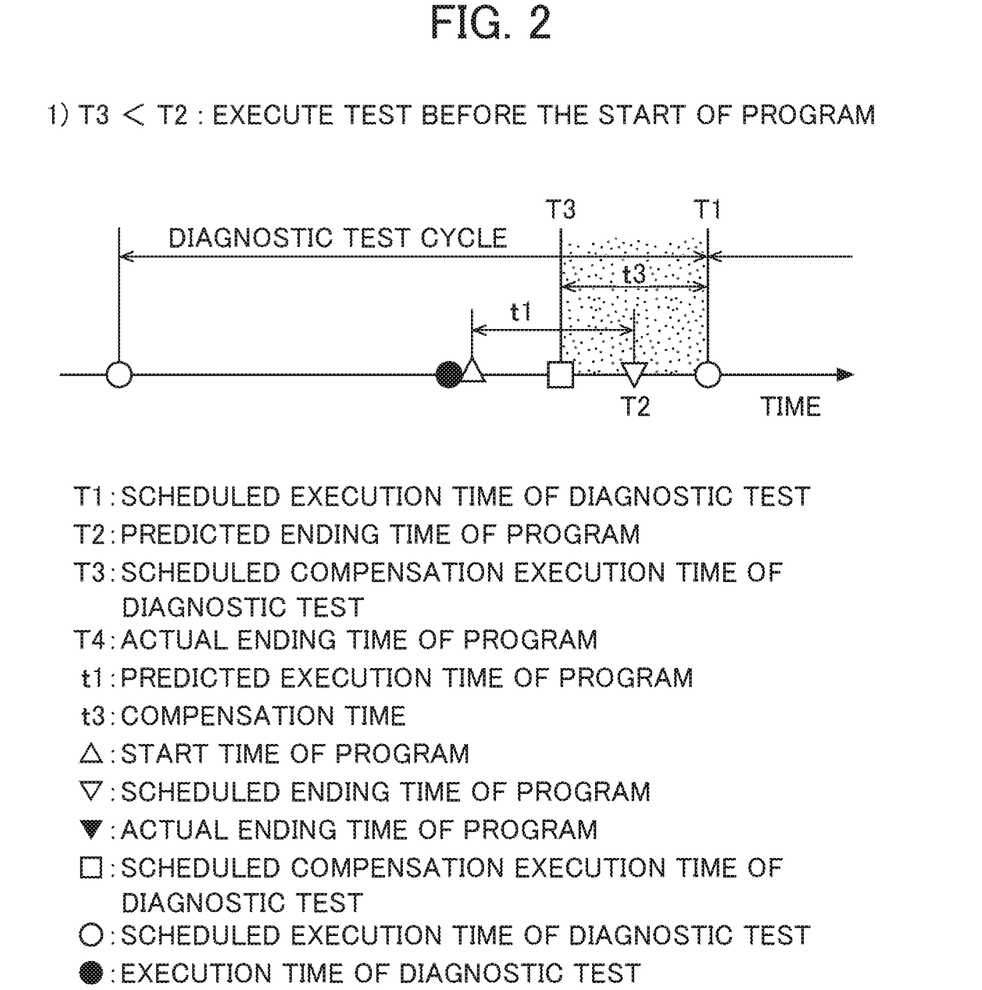
FIG. 2 is a timing chart illustrating execution of a diagnostic test and an execution of a program when $T3<T2$.
Figure 3:
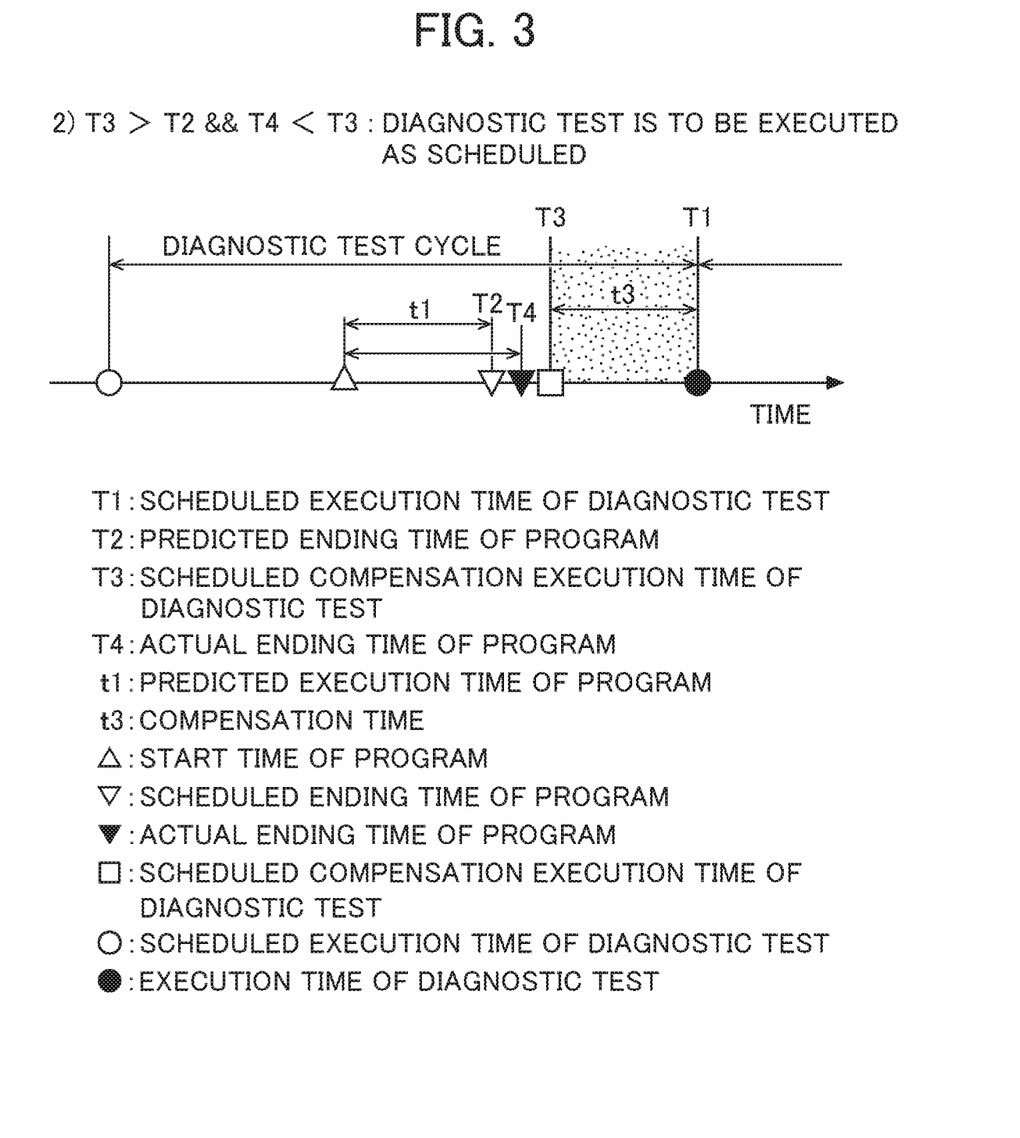
FIG. 3 is a timing chart illustrating the execution of the diagnostic test and the execution of the program when $T3>T2$ and $T4<T3$.
Figure 4:
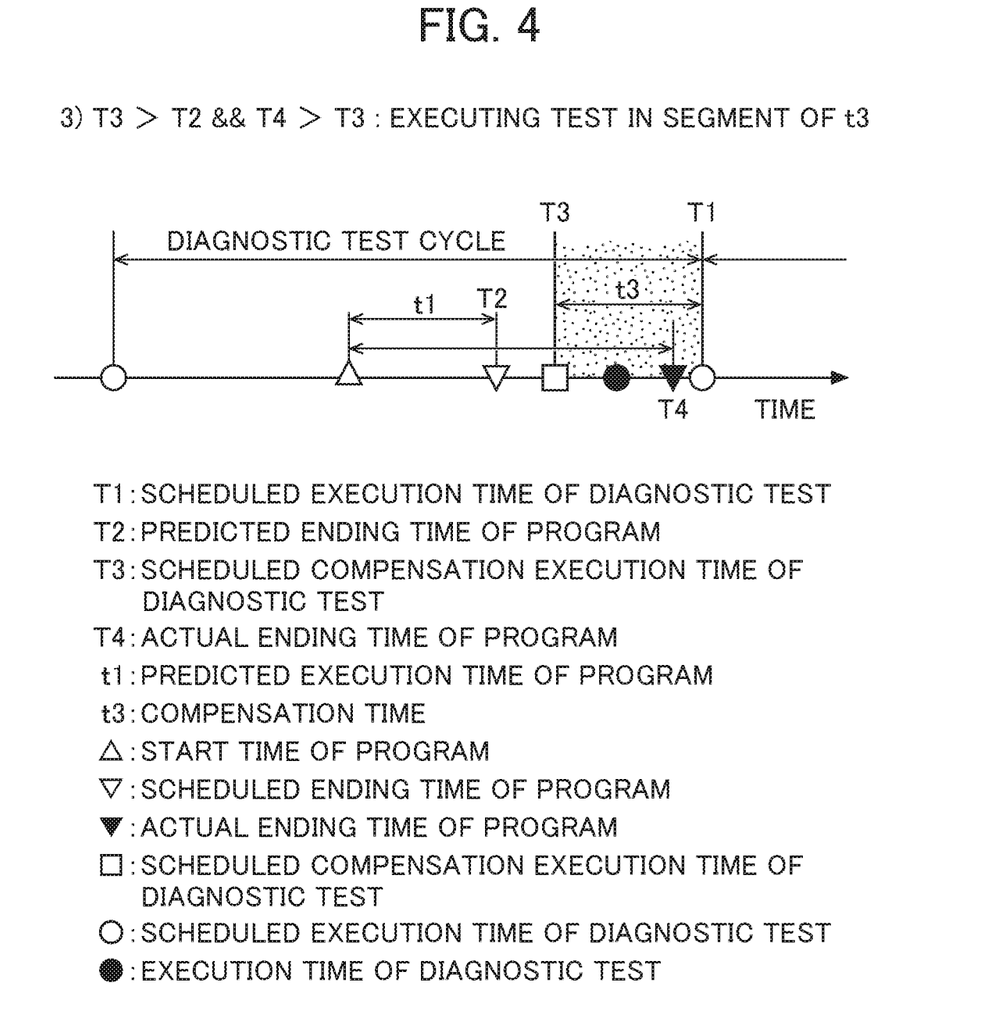
FIG. 4 is a timing chart illustrating the execution of the diagnostic test and the execution of the program when $T3>T2$ and $T4>T3$.

FIG. 2 is a timing chart illustrating the execution of a diagnostic test and the execution of a program when T3<T2. FIG. 3 is a timing chart illustrating the execution of the diagnostic test and the execution of the program when T3>T2 and T4<T3. FIG. 4 is a timing chart illustrating the execution of the diagnostic test and the execution of the program when T3>T2 and T4>T3. In FIGS. 2 to 4, each time, each time of day, and each symbol are as follows.

T1: Scheduled Execution Time of Diagnostic Test
T2: Predicted Ending Time of Program
T3: Scheduled Compensation Execution Time of Diagnostic Test
T4: Actual Ending Time of Program
t1: Predicted Execution Time of Program
t3: Compensation Time
White Triangle (upward): Start Time of Program
White Triangle (downward): Scheduled Ending Time of Program
Black Triangle (downward): Actual Ending Time of Program
White Square: Scheduled Compensation Execution Time of Diagnostic test
White (Open) Circle: Scheduled Execution Time of Diagnostic Test
Black Circle: Execution Time of Diagnostic Test The diagnostic test time calculation unit 12 calculates the scheduled execution time T1 of the diagnostic test.

The program execution time prediction unit 14 predicts the predicted execution time t1 of the program and predicts the predicted ending time T2 of the program before the execution of the program.

The storage unit 16 stores a predetermined compensation time t3 for compensating for the scheduled execution time T1 of the diagnostic test. The actual execution time of the program may extend relative to the predicted execution time t1. In other words, the actual ending time of the program may lag relative to the predicted ending time T2. Examples thereof include a tool change program. It suffices that the predetermined compensation time t3 may be set in consideration of an extension time of the actual ending time with respect to the predicted execution time t1 of the program, that is, a delay time of the actual ending time with respect to the predicted ending time T2 of the program.

The diagnostic test execution determination unit 18 determines whether or not to execute the diagnostic test at the next predetermined time in the regular cycle. More specifically, the diagnostic test execution determination unit 18 calculates the scheduled compensation execution time T3 of the diagnostic test obtained by subtracting the predetermined compensation time t3 from the scheduled execution time T1 of the diagnostic test, and determines whether or not the predicted ending time T2 of the program exceeds the scheduled compensation execution time T3 of the diagnostic test.

As illustrated in FIG. 2, in a case in which the predicted ending time T2 of the program exceeds the scheduled compensation execution time T3 of the diagnostic test, the diagnostic test execution determination unit 18 instructs the diagnostic test execution unit 24 to execute the diagnostic test prior to the scheduled execution time T1 of the diagnostic test before the execution of the program. On the other hand, as illustrated in FIG. 3, in a case in which the predicted ending time T2 of the program does not exceed the scheduled compensation execution time T3 of the diagnostic test, the diagnostic test execution determination unit 18 requests the diagnostic test execution management unit 22 to execute the diagnostic test at the scheduled execution time T1 of the diagnostic test after the execution of the program.

The diagnostic test execution management unit 22 manages the execution of the diagnostic test during and after the execution of the program. Specifically, as illustrated in FIG. 3, in a case in which the diagnostic test execution determination unit 18 determines that the predicted ending time T2 of the program does not exceed the scheduled compensation execution time T3 of the diagnostic test, and does not exceed the scheduled compensation execution time T3 of the diagnostic test during the execution of the program (i.e., in a case in which the actual ending time T4 of the program does not exceed the scheduled compensation execution time T3 of the diagnostic test), the diagnostic test execution management unit 22 instructs the diagnostic test execution unit 24 to execute the diagnostic test at the scheduled execution time T1 of the diagnostic test after the execution of the program.

On the other hand, as illustrated in FIG. 4, in a case in which the diagnostic test execution determination unit 18 determines that the predicted ending time T2 of the program does not exceed the scheduled compensation execution time T3 of the diagnostic test, and exceeds the scheduled compensation execution time T3 of the diagnostic test during the execution of the program (i.e., in a case in which the actual ending time T4 of the program exceeds the scheduled compensation execution time T3 of the diagnostic test), the diagnostic test execution management unit 22 requests the program execution unit to stop the program in a diagnostic test executable block (e.g., a non-machining block including a positioning operation or a stopping operation in the program) of the program analyzed by the program analysis unit 26, and instructs the diagnostic test execution unit 24 to execute the diagnostic test during the program being stopped.

The diagnostic test execution unit 24 executes the diagnostic test in response to an execution command of the diagnostic test from the diagnostic test execution determination unit 18 or the diagnostic test execution management unit 22.

The program analysis unit 26 analyzes the program.

The program execution unit 28 executes the program. The program execution unit 28 stops the program in the diagnostic test executable block of the program analyzed by the program analysis unit 26 in response to the stop request from the diagnostic test execution management unit 22. After stopping the program, the program execution unit 28 causes the machine to move to a reference position.

Figure 5:
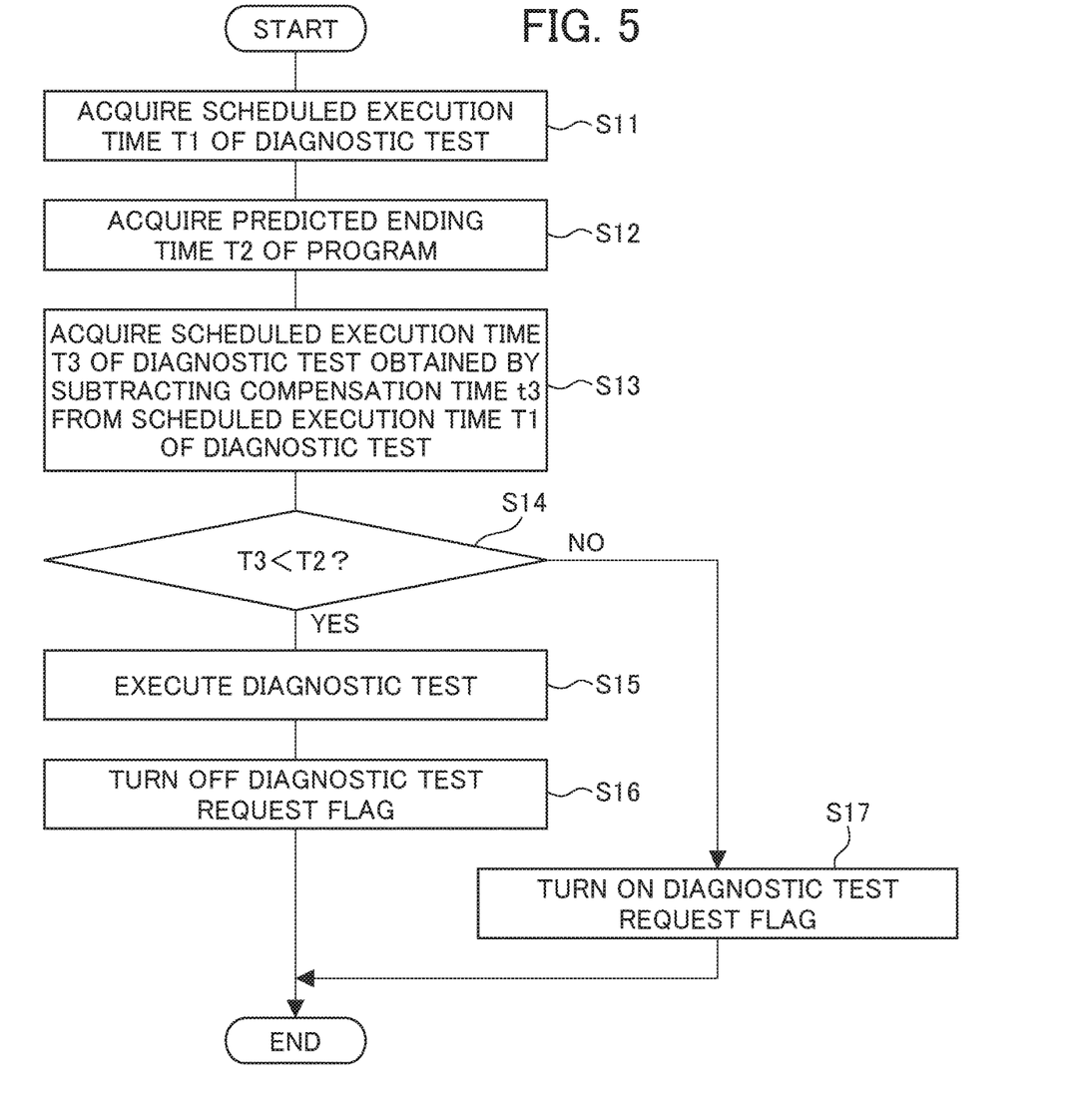
FIG. 5 is a flowchart illustrating operation before the execution of the program of the machine control device according to the present embodiment.
Figure 6:
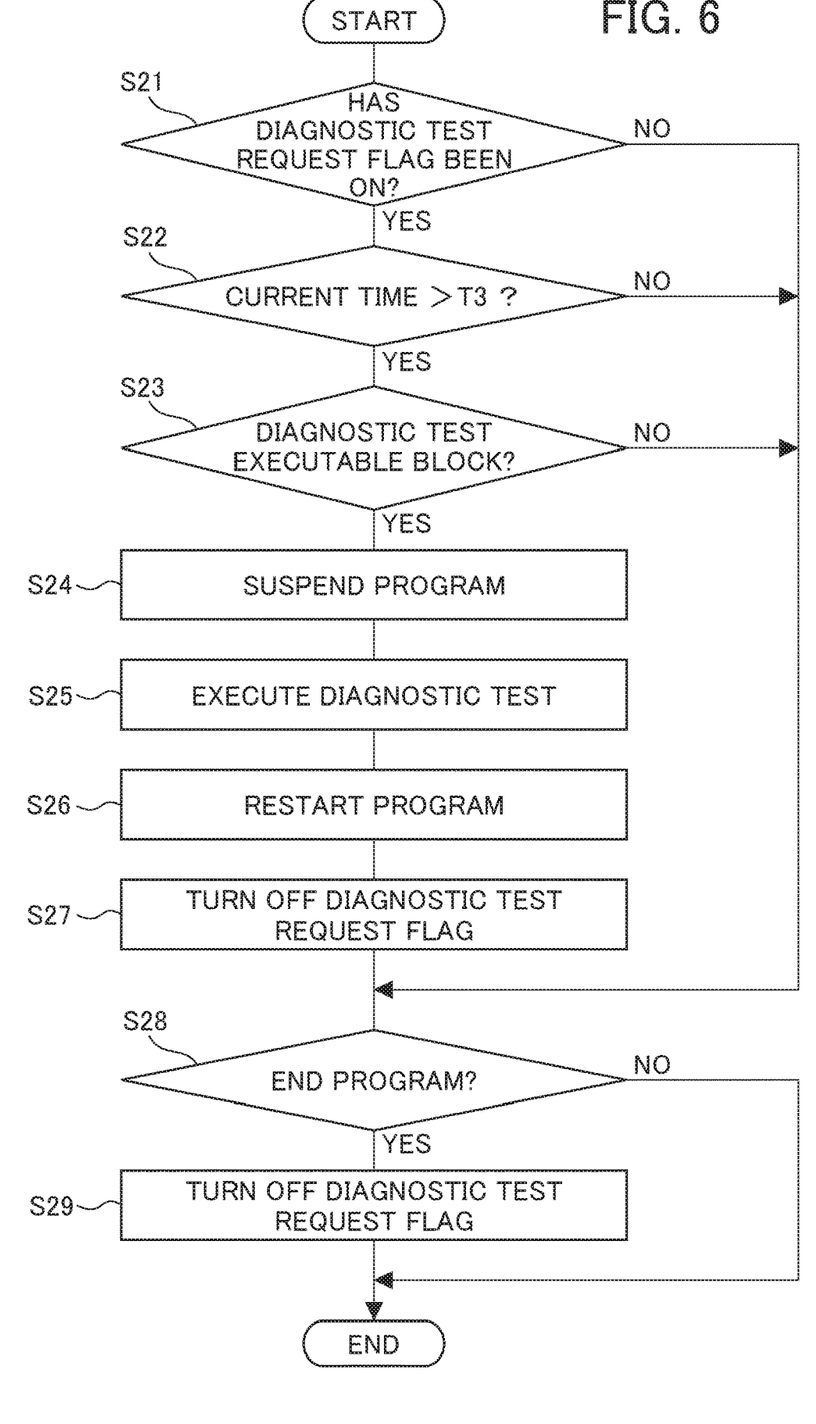
FIG. 6 is a flowchart illustrating operation during the execution of the program of the machine control device according to the present embodiment.

Next, with reference to FIGS. 5 and 6, the operation of the machine control device according to the present embodiment will be described. FIG. 5 is a flowchart illustrating an operation before the execution of the program of the machine control device according to the present embodiment. FIG. 6 is a flowchart illustrating the operation during the execution of the program of the machine control device according to the present embodiment.

First, referring to FIG. 5, the operation of the machine control device 10 before the execution of the program will be described. In Step S11, the diagnostic test execution determination unit 18 acquires the scheduled execution time T1 of the diagnostic test calculated by the diagnostic test time calculation unit 12. Furthermore, in Step S12, the diagnostic test execution determination unit 18 acquires the predicted ending time T2 of the program predicted by the program execution time prediction unit 14. Furthermore, in Step S13, the diagnostic test execution determination unit 18 acquires the compensation time t3 stored in the storage unit 16, and thereby acquires the scheduled compensation execution time T3 of the diagnostic test obtained by subtracting the compensation time t3 from the scheduled execution time T1 of the diagnostic test.

In Step S14, the diagnostic test execution determination unit 18 determines whether or not the predicted ending time T2 of the program exceeds the scheduled compensation execution time T3 of the diagnostic test, and thereby determines whether or not to execute the diagnostic test at the next predetermined time in the regular cycle (time interval).

As illustrated in FIG. 2, in a case in which the predicted ending time T2 of the program exceeds the scheduled compensation execution time T3 of the diagnostic test (YES in Step S14), the diagnostic test execution determination unit 18 commands the diagnostic test execution unit 24 to execute the diagnostic test so as to execute the diagnostic test prior to the scheduled execution time T1 of the diagnostic test before executing the program. With such a configuration, in Step S15, the diagnostic test execution unit 24 executes the diagnostic test before starting the program. Furthermore, in Step S16, the diagnostic test execution determination unit 18 turns off the diagnostic test request flag. With such a configuration, the diagnostic test execution management unit 22 does not perform the execution management of the diagnostic test during and after the execution of the program, which will be described later.

On the other hand, as illustrated in FIG. 3, in a case in which the predicted ending time T2 of the program does not exceed the scheduled compensation execution time T3 of the diagnostic test (NO in Step S14), the diagnostic test execution determination unit 18 turns on a diagnostic test request flag in Step S17. With such a configuration, the diagnostic test execution management unit 22 performs the execution management of the diagnostic test during and after the execution of the program, which will be described later.

Next, referring to FIG. 6, the operation of the machine control device 10 during the execution of the program will be described. In Step S21, the diagnostic test execution management unit 22 determines whether or not the diagnostic test request flag is ON (i.e., whether or not the predicted ending time T2 of the program does not exceed the scheduled compensation execution time T3 of the diagnostic test).

In Step S22, in a case in which the diagnostic test request flag is ON (i.e., in a case in which the predicted ending time T2 of the program does not exceed the scheduled compensation execution time T3 of the diagnostic test as illustrated in FIGS. 3 and 4) (YES in Step S21), the diagnostic test execution management unit 22 determines whether or not the current time exceeds the scheduled compensation execution time T3 of the diagnostic test (i.e., whether or not the current time exceeds the scheduled compensation execution time T3 of the diagnostic test during the execution of the program, in other words, whether or not the actual ending time T4 of the program exceeds the scheduled compensation execution time T3 of the diagnostic test.

In a case in which the current time exceeds the scheduled compensation execution time T3 of the diagnostic test (that is, in a case in which the current time exceeds the scheduled compensation execution time T3 of the diagnostic test during the execution of the program, in other words, in a case in which the actual ending time T4 of the program exceeds the scheduled compensation execution time T3 of the diagnostic test as illustrated in FIG. 4) (YES in Step S22), the diagnostic test execution management unit 22 requests the program execution unit 28 to stop the program in the diagnostic test executable block (for example, a non-machined block including a positioning operation or a stop operation in the program) of the program analyzed by the program analysis unit 26. With such a configuration, in Step S23, the program execution unit 28 determines whether the block is a diagnostic test executable block.

In a case in which the block is the diagnostic test executable block (YES in Step S23), the program execution unit 28 stops the program in the diagnostic test executable block. For example, in Step S24, the program execution unit 28 stops (suspends) the program at the position where the positioning operation is completed. After stopping the program, the program execution unit 28 moves the machine to the reference position (a safe position).

The diagnostic test execution management unit 22 commands the diagnostic test execution unit 24 to execute the diagnostic test so as to execute the diagnostic test while the program are stopped. With such a configuration, in Step S25, the diagnostic test execution unit 24 executes the diagnostic test while the program is stopped.

Next, the diagnostic test execution management unit 22 requests the program execution unit 28 to restart the program. With such a configuration, in Step S26, the program execution unit 28 returns the machine from the reference position to, for example, the position at which the positioning operation is completed, and restarts the program. In Step S27, the diagnostic test execution management unit 22 turns off the diagnostic test request flag.

On the other hand, in a case in which the diagnostic test request flag is OFF in Step S21 (NO in Step S21), the processing proceeds to Step S28 (described later).

Furthermore, in a case in which the diagnostic test request flag is ON (i.e., the predicted ending time T2 of the program does not exceed the scheduled compensation execution time T3 of the diagnostic test) and the current time does not exceed the scheduled compensation execution time T3 of the diagnostic test (i.e., in a case in which the actual ending time T4 of the program does not exceed the scheduled compensation execution time T3 of the diagnostic test during the execution of the program, in other words, in a case in which the actual ending time T4 of the program does not exceed the scheduled compensation execution time T3 of the diagnostic test as illustrated in FIG. 3) (NO in Step S22), the diagnostic test execution management unit 22 commands the diagnostic test execution unit 24 to execute the diagnostic test at the scheduled execution time T1 of the diagnostic test after the execution of the program. The processing proceeds to Step S28, which will be described later.

In Step S21, in a case in which the diagnostic test request flag is ON (i.e., the predicted ending time T2 of the program does not exceed the scheduled compensation execution time T3 of the diagnostic test), the current time exceeds the scheduled compensation execution time T3 of the diagnostic test (i.e., the current time exceeds the scheduled compensation execution time T3 of the diagnostic test during the execution of the program, in other words, the actual program ending time exceeds the scheduled compensation execution time T3 of the diagnostic test), and the block is not the diagnostic test executable block (NO in Step S23), the processing proceeds to Step S28 described later.

In Step S28, it is determined whether or not the program has finished. In Step S29, in a case in which the program has finished (YES in Step S28), the diagnostic test request flag is turned OFF. On the other hand, in a case in which the program has not finished (NO in Step S28), the processing is finished without resetting the diagnostic test request flag to OFF (for example, the operations of Steps S21 to S29 are repeated).

As described above, according to the machine control device 10 according to the present embodiment, the predicted ending time of the program is predicted before the execution of the program, and in a case in which the predicted ending time of the program exceeds the scheduled execution time of the diagnostic test, the diagnostic test is executed before the execution of the program prior to the scheduled execution time of the diagnostic test. With such a configuration, (1) It is possible to execute diagnostic tests within a predetermined period of time (regular cycle, time interval). As a result, it is possible to suppress deterioration in the safety of the machine due to failure of the mechanical components or the like. It should be noted that, if the cycle of the diagnostic test is set to be short, the safety of the machine can be improved.

(2) It is possible to execute diagnostic tests while avoiding the occurrence of machining defects.

(3) It is possible to execute diagnostic tests automatically. With such a configuration, it is possible to reduce the burden on a machine operator.

Furthermore, according to the machine control device 10 related to the present embodiment, the scheduled compensation execution time T3 of the diagnostic test obtained by subtracting the predetermined compensation time t3 from the scheduled execution time T1 of the diagnostic test is calculated, and in a case in which the predicted ending time T2 of the program exceeds the scheduled compensation execution time T3 of the diagnostic test, the diagnostic test is executed before the execution of the program prior to the scheduled execution time T1 of the diagnostic test. With such a configuration, it is possible to compensate for the extension time of the actual ending time with respect to the predicted execution time t1 of the program, that is, the delay time of the actual ending time with respect to the predicted ending time T2 of the program.

Furthermore, according to the machine control device 10 related to the present embodiment, in a case in which the predicted ending time T2 of the program does not exceed the scheduled compensation execution time T3 of the diagnostic test and exceeds the scheduled compensation execution time T3 of the diagnostic test during the execution of the program, the program are stopped in the diagnostic test executable blocks of the program, and the diagnostic test is executed while the program are stopped. With such a configuration, (2) It is possible to execute the diagnostic tests even during machining, while avoiding the occurrence of machining defects.

As a method of avoiding the execution of the diagnostic test during the automatic operation of the machine, a method of delaying the start time of the automatic operation is considered. However, in this method, a dead time for stopping the machining is generated, and the productivity is lowered. On the contrary, according to the machine control device 10 according to the present embodiment, it is possible to avoid dead times of stopping machining and to avoid a decrease in productivity.

Modification Example

Figure 7:
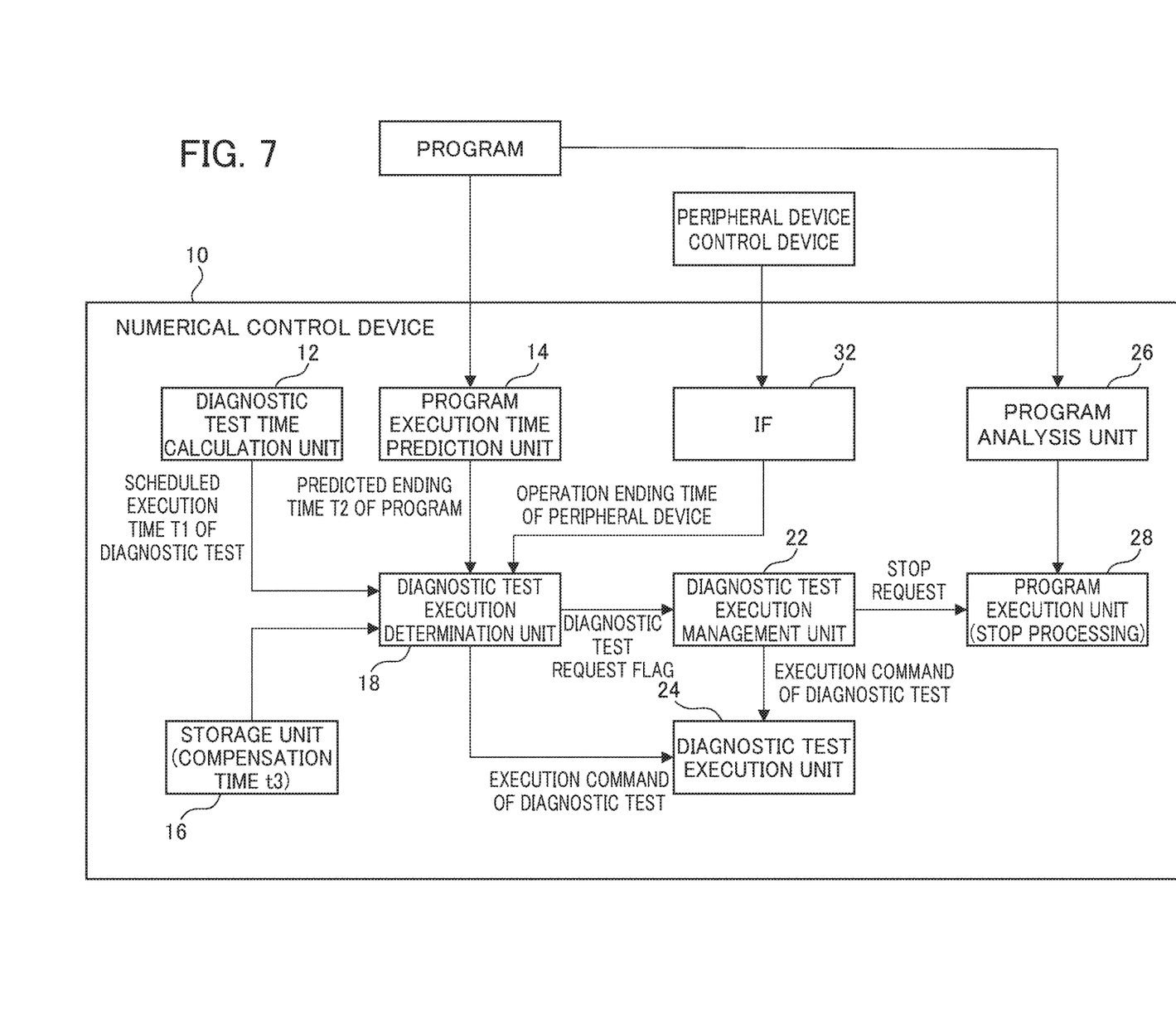
FIG. 7 is a diagram illustrating the configuration of a machine control device according to a modification example of the present embodiment.

FIG. 7 is a diagram illustrating the configuration of a machine control device 10 according to a modification example of the present embodiment. The machine control device 10 illustrated in FIG. 7 differs from the machine control device 10 illustrated in FIG. 1 in that it further includes an interface (IF: an acquisition unit) 32. The interface 32 acquires a scheduled operation time (e.g., an operation starting time and an operation ending time) of a peripheral device from the control device of the peripheral device such as a robot or a transporter via a network.

The diagnostic test execution determination unit 18 may determine the execution of the diagnostic test on the basis of the operation ending time of the peripheral device in addition to the predicted ending time T2 of the program. More specifically, the diagnostic test execution determination unit 18 may determine whether or not to execute the diagnostic test at a predetermined time by determining whether or not the scheduled operation time of the peripheral device exceeds the scheduled compensation execution time T3 of the diagnostic test.

With such a configuration, in a case in which the scheduled operation time of the peripheral device exceeds the scheduled compensation execution time T3 of the diagnostic test, the diagnostic test execution determination unit 18 may instruct the diagnostic test execution unit 24 to execute the diagnostic test prior to the scheduled execution time T1 of the diagnostic test before the execution of the program.

Furthermore, in a case in which the diagnostic test execution determination unit 18 determines that the scheduled operation time of the peripheral device does not exceed the scheduled compensation execution time T3 of the diagnostic test and exceeds the scheduled compensation execution time T3 of the diagnostic test during the execution of the program, the diagnostic test execution management unit 22 may request the program execution unit 28 to stop the program in the diagnostic test executable block of the program analyzed by the program analysis unit 26, and may instruct the diagnostic test execution unit 24 to execute the diagnostic test while the program is stopped.

In this manner, by determining the execution of the diagnostic test on the basis of the operation ending time of the peripheral device in addition to the predicted ending time T2 of the program, it is possible to avoid the execution of the diagnostic test during the operation of the peripheral device.

Modification Example

In the present embodiment, the scheduled compensation execution time T3 of the diagnostic test obtained by subtracting the predetermined compensation time t3 from the scheduled execution time T1 of the diagnostic test is used in determining the execution of the diagnostic test; however, the scheduled execution time T1 of the diagnostic test itself may be used instead of the scheduled compensation execution time T3 of the diagnostic test. Also in this case, it is possible for the diagnostic test execution determination unit 18 to determine whether or not to execute the diagnostic test at the next predetermined time in the regular cycle (time interval) by determining whether or not the predicted ending time T2 of the program exceeds the scheduled execution time T1 of the diagnostic test. Furthermore, in a case in which the predicted ending time T2 of the program exceeds the scheduled execution time T1 of the diagnostic test, it is possible for the diagnostic test execution determination unit 18 to instruct the diagnostic test execution unit 24 to execute the diagnostic test prior to the scheduled execution time T1 of the diagnostic test before executing the program.

Although embodiments of the present invention have been described above, the present invention is not limited to the embodiments described above, and various modifications and variations are possible. For example, the embodiment described above exemplifies a machine control device that repeatedly executes the diagnostic test at predetermined intervals, that is, at regular time intervals; however, the present embodiment is not limited thereto, and is also applicable to a machine control device that executes the diagnostic test only once at predetermined time.

In addition, the above embodiment exemplifies a numerical value control device of the machine tool for controlling the machine tool; however, the present embodiment is not limited thereto, and can be applied to the control device of various machines such as industrial robots.

EXPLANATION OF REFERENCE NUMERALS 10 machine control device
12 diagnostic test time calculation unit
14 program execution time prediction unit
16 storage unit
18 diagnostic test execution determination unit
22 diagnostic test execution management unit
24 diagnostic test execution unit
26 program analysis unit
28 program execution unit (program stop processing unit)
32 interface (IF: acquisition unit)

What is claimed is:

1. A machine control device that controls operation of a machine on a basis of a program and executes a diagnostic test of a safety function of the machine, the machine control device comprising:
   a diagnostic test time calculation unit that calculates a scheduled execution time T1 of the diagnostic test;
   a program execution time prediction unit that predicts a predicted ending time T2 of the program before executing the program;
   a diagnostic test execution determination unit that determines whether to execute the diagnostic test at a predetermined time, by determining whether the predicted ending time T2 of the program exceeds the scheduled execution time T1 of the diagnostic test; and
   a diagnostic test execution unit that executes the diagnostic test,
   wherein, in a case in which the predicted ending time T2 of the program exceeds the scheduled execution time T1 of the diagnostic test, the diagnostic test execution determination unit instructs the diagnostic test execution unit to execute the diagnostic test prior to the scheduled execution time T1 of the diagnostic test before executing the program.

2. The machine control device according to claim 1, wherein the diagnostic test execution determination unit
   calculates a scheduled compensation execution time T3 of the diagnostic test obtained by subtracting a predetermined compensation time t3 from the scheduled execution time T1 of the diagnostic test,
   determines whether to execute the diagnostic test at the predetermined time by determining whether the predicted ending time T2 of the program exceeds the scheduled compensation execution time T3 of the diagnostic test, and
   instructs the diagnostic test execution unit, in a case in which the predicted ending time T2 of the program exceeds the scheduled compensation execution time T3 of the diagnostic test, to execute the diagnostic test prior to the scheduled execution time T1 of the diagnostic test before executing the program.

3. The machine control device according to claim 2, further comprising:
   a diagnostic test execution management unit that manages execution of the diagnostic test during and after execution of the program;
   a program analysis unit that analyzes the program; and
   a program stop processing unit that performs stop processing of the program,
   wherein in a case in which the diagnostic test execution determination unit determines that the predicted ending time T2 of the program does not exceed the scheduled compensation execution time T3 of the diagnostic test, and exceeds the scheduled compensation execution time T3 of the diagnostic test during the execution of the program, the diagnostic test execution management unit requests the program stop processing unit to stop the program in a diagnostic test executable block of the program analyzed by the program analysis unit, and instructs the diagnostic test execution unit to execute the diagnostic test during the program being stopped.

4. The machine control device according to claim 3, wherein the program stop processing unit stops the program, and subsequently causes the machine to move to a reference position.

5. The machine control device according to claim 3, wherein the diagnostic test executable block is a non-machining block including a positioning operation or a stopping operation in the program.

6. The machine control device according to claim 2, further comprising an acquisition unit that acquires an operation ending time of a peripheral device,
   wherein the diagnostic test execution determination unit determines whether to execute the diagnostic test at the predetermined time, by determining whether a scheduled operation time of the peripheral device exceeds the scheduled compensation execution time T3 of the diagnostic test.

\* \* \* \* \*